(12) United States Patent
Anderson et al.

(10) Patent No.: US 11,679,727 B2
(45) Date of Patent: Jun. 20, 2023

(54) TOP TETHER BEZEL

(71) Applicant: TOYOTA BOSHOKU KABUSHIKI KAISHA, Aichi-ken (JP)

(72) Inventors: Kyle Anderson, Brighton, MI (US); Kevin Hayes, Canton, MI (US)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 106 days.

(21) Appl. No.: 17/493,012

(22) Filed: Oct. 4, 2021

(65) Prior Publication Data

US 2022/0105882 A1  Apr. 7, 2022

Related U.S. Application Data

(60) Provisional application No. 63/087,727, filed on Oct. 5, 2020.

(51) Int. Cl.
*B60R 13/02* (2006.01)

(52) U.S. Cl.
CPC .............................. *B60R 13/0206* (2013.01)

(58) Field of Classification Search
CPC ................................................ B60R 13/0206
See application file for complete search history.

(56) References Cited

U.S. PATENT DOCUMENTS

| | | | |
|---|---|---|---|
| 5,556,171 A | 9/1996 | Busch | |
| 5,716,073 A | 2/1998 | Redman | |
| 6,322,141 B1 * | 11/2001 | Dutkievic | B60N 2/5825 |
| | | | 297/219.1 |
| 7,175,217 B1 | 2/2007 | Lota | |
| 8,684,443 B2 | 4/2014 | Hara | |
| 8,720,118 B2 | 5/2014 | Meyers et al. | |
| 9,340,128 B2 * | 5/2016 | Arai | B60N 2/6009 |
| 9,604,555 B2 * | 3/2017 | Fujikake | B60N 2/2887 |
| 9,656,577 B2 * | 5/2017 | Sekino | B60N 2/289 |
| 11,325,507 B2 * | 5/2022 | Kang | B60N 2/2806 |
| 2009/0127897 A1 | 5/2009 | Watanabe et al. | |
| 2011/0272548 A1 | 11/2011 | Rudkowski et al. | |
| 2013/0049388 A1 | 2/2013 | Stachura et al. | |

FOREIGN PATENT DOCUMENTS

| | | | |
|---|---|---|---|
| JP | 2017190094 A | * | 10/2017 |
| JP | 2021070357 A | * | 5/2021 |

* cited by examiner

*Primary Examiner* — Dennis H Pedder
*Assistant Examiner* — Melissa Ann Bonifazi
(74) *Attorney, Agent, or Firm* — Greenblum & Bernstein, P.L.C.

(57) ABSTRACT

In one example, a vehicle seat assembly includes a flexible trim cover including an opening and a trim plate received in the opening of the trim cover. The trim plate includes an opening. The vehicle seat assembly includes a bezel received in the opening of the trim plate, and the bezel includes a trim and a housing. The trim surrounds the housing, and the housing of the bezel includes a channel that receives a top tether wire.

17 Claims, 10 Drawing Sheets

TOP TETHER BEZEL

CROSS-REFERENCE TO RELATED APPLICATION

This application claims the benefit of U.S. Provisional Application No. 63/087,727 filed on Oct. 5, 2020.

BACKGROUND

A top tether bezel of a child restraint system is attached to a seat assembly by the connection to a rigid part relative to a frame.

SUMMARY

In one example, a vehicle seat assembly includes a flexible trim cover including an opening and a trim plate received in the opening of the trim cover. The trim plate includes an opening. The vehicle seat assembly includes a bezel received in the opening of the trim plate, and the bezel includes a trim and a housing. The trim surrounds the housing, and the housing of the bezel includes a channel that receives a top tether wire.

In another embodiment, the bezel is comprised of resin.

In another embodiment, the trim cover and the trim plate are attached with stiches.

In another embodiment, a front surface of the trim of the bezel contacts a rear surface of the trim cover.

In another embodiment, the trim of the bezel includes a bottom portion including a front flange and a rear flange defining a space therebetween, a top flange, a first side flange, and a second side flange. The trim plate includes a bottom portion, a top portion, a first side portion, and a second side portion. A portion of the bottom portion of the trim plate is received in the space between the front flange and the rear flange of the bottom portion of the trim of the bezel, and the top flange of the trim of the bezel aligns with the top portion of the trim plate. The first side flange of the trim of the bezel aligns with the first side portion of the trim plate, and the second side flange of the trim of the bezel aligns with the second side portion of the trim plate.

In another embodiment, the housing of the bezel includes a first side face, a second side face, at least one resilient tab located on the first side face of the housing, and another at least one resilient tab located on the second side face of the housing. The at least one resilient tab and the another at least one resilient tab secure the trim of the bezel to the trim plate.

In another embodiment, in an initial position, a space is defined between the at least one resilient tab and the first side flange of the trim of the bezel and another space is defined between the another at least one resilient tab and the second side flange of the trim of the bezel. Insertion of the housing of the bezel into the opening of the trim plate biases the at least one resilient tab and the another at least one resilient tab from the initial position to a biased position to allow insertion of the housing of the trim bezel into the opening of the trim plate. The at least one resilient tab and the another at least one resilient tab return to the initial position once the first side portion and the second side portion, respectively, of the trim bezel are received in the space and the another space, respectively, of the bezel to secure the bezel to the trim plate.

In another embodiment, the housing of the bezel includes a front face, a top face, a bottom face, a first side face, a second side face, and a channel that receives the top tether wire. The channel includes a main portion on the front face of the housing, a first portion on the first side face of the housing, and a second portion on the second side face of the housing.

In another embodiment, the housing of the bezel includes a first enlarged opening located at an end of the first portion of the channel that is continuous with the first portion of the channel and a second enlarged opening located at an end of the second portion of the channel that is continuous with the second portion of the channel. The first enlarged opening and the second enlarged opening both have a dimension greater than the width of the channel, and the channel has an expandable width to allow passage of the top tether wire through the channel and into the first enlarged opening and the second enlarged opening. The first enlarged opening and the second enlarged opening are proximate to the first side portion and the second side portion, respectively, of the trim plate.

In another embodiment, the at least one resilient tab includes a first resilient tab and a second resilient tab, and the another at least one resilient tab includes a third resilient tab and a fourth resilient tab. The first enlarged opening is located between the first resilient tab and the second resilient tab, and the second enlarged opening is located between the third resilient tab and the fourth resilient tab.

In another example, a vehicle seat assembly includes a flexible trim cover including an opening and a trim plate received in the opening of the trim cover, wherein the trim plate includes a bottom portion, a top portion, a first side portion, and a second side portion, and the trim plate defines an opening. The vehicle seat assembly includes a bezel received in the opening of the trim plate, and the bezel includes a housing and a trim that surrounds the housing. The trim of the bezel includes a bottom portion including a front flange and a rear flange defining a space therebetween, a top flange, a first side flange, and a second side flange. The housing of the bezel includes a front face, a top face, a bottom face, a first side face, a second side face, and a channel that receives the top tether wire. The channel includes a main portion on the front face of the housing, a first portion on the first side face of the housing, and a second portion on the second side face of the housing. The channel receives a top tether wire, at least one resilient tab is located on the first side face of the housing, and another at least one resilient tab is located on the second side face of the housing. The at least one resilient tab and the another at least one resilient tab secure the trim of the bezel to the trim plate. A front surface of the trim of the bezel contacts a rear surface of the trim cover. A portion of the bottom portion of the trim plate is received in the space between the front flange and the rear flange of the bottom portion of the trim of the bezel, and the top flange of the trim of the bezel aligns with the top portion of the trim plate. The first side flange of the trim of the bezel aligns with the first side portion of the trim plate, and the second side flange of the trim of the bezel aligns with the second side portion of the trim plate. When in an initial position, a space is defined between the at least one resilient tab and the first side flange of the trim of the bezel and another space is defined between the another at least one resilient tab and the second side flange of the trim of the bezel. Insertion of the housing of the bezel into the opening of the trim plate biases the at least one resilient tab and the another at least one resilient tab from the initial position to a biased position to allow insertion of the housing of the trim bezel into the opening of the trim plate. The at least one resilient tab and the another at least one resilient tab return to the initial position once the first side portion and the second side portion, respectively, of the trim bezel are received in space and the another space, respectively, of the bezel to secure the bezel to the trim plate.

In another embodiment, the bezel is comprised of resin.

In another embodiment, the trim cover and the trim plate are attached with stiches.

In another embodiment, the housing of the bezel includes a first enlarged opening located at an end of the first portion of the channel that is continuous with the first portion of the channel and a second enlarged opening located at an end of the second portion of the channel that is continuous with the second portion of the channel. The first enlarged opening and the second enlarged opening both have a dimension greater than the width of the channel, and the channel has an expandable width to allow passage of the top tether wire through the channel and into the first enlarged opening and the second enlarged opening. The first enlarged opening and the second enlarged opening are proximate to the first side portion and the second side portion, respectively, of the trim plate.

In another embodiment, the at least one resilient tab includes a first resilient tab and a second resilient tab, and the another at least one resilient tab includes a third resilient tab and a fourth resilient tab. The first enlarged opening is located between the first resilient tab and the second resilient tab, and the second enlarged opening is located between the third resilient tab and the fourth resilient tab.

In another example, a method of attaching a bezel to a flexible trim cover and a trim plate attached to a vehicle seat includes positioning a portion of a trim plate in a space defined between a front flange and a rear flange of a trim of a bezel, rotating the bezel about an axis defined by a point between the front flange and the rear flange, and positioning the bezel in an opening of the trim plate.

In another example, the method includes securing the bezel to the trim plate with flexible fasteners.

DETAILED DESCRIPTION

Figure 1:
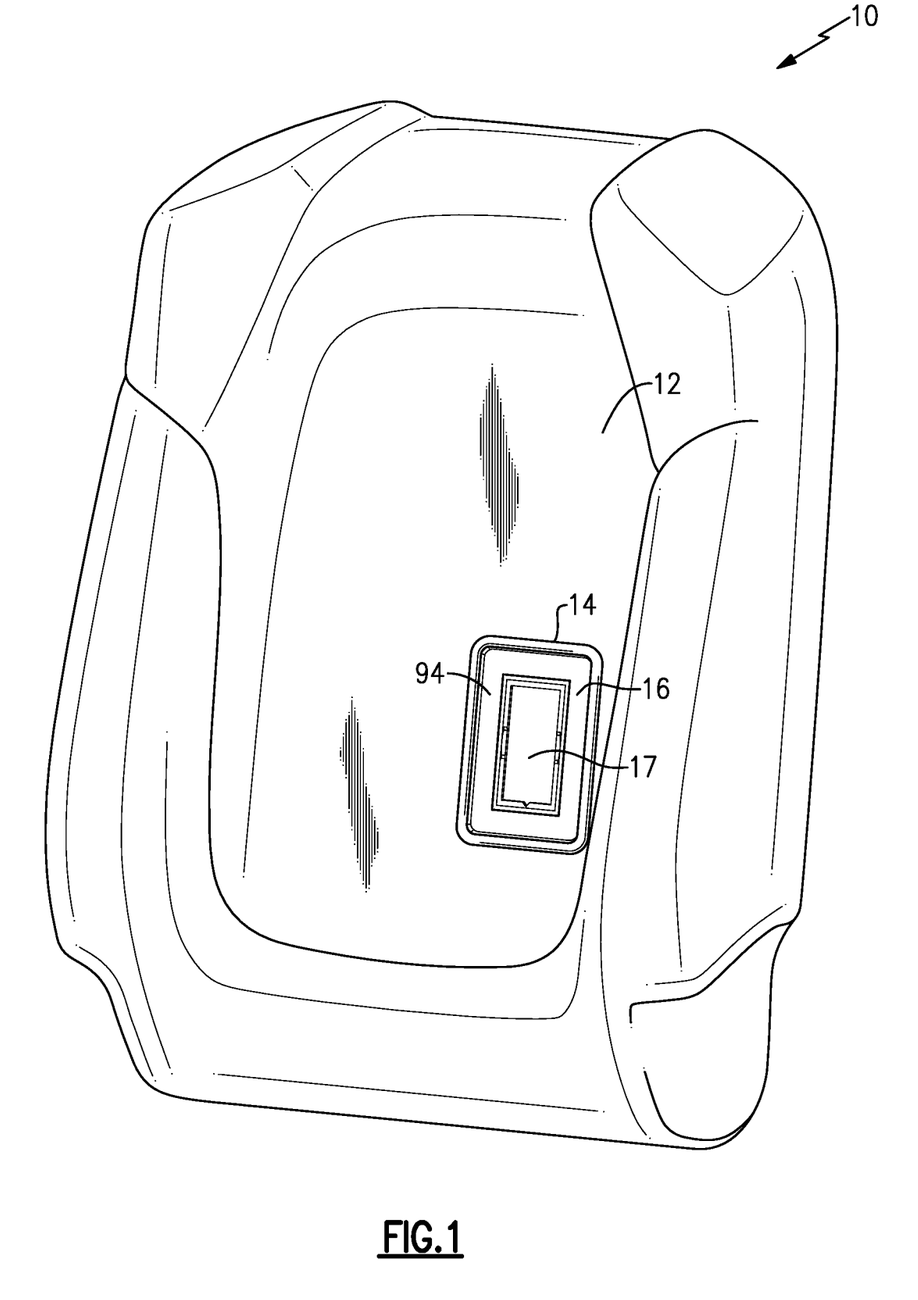
FIG. 1 illustrates a perspective view of vehicle seat with a trim plate attached to a trim cover.

FIG. 1 illustrates a vehicle seat 10 including a trim cover 12. In one example, the trim cover 12 is flexible and not rigid. The trim cover 12 includes an opening 14, and a trim plate 16 is received in the opening 14 of the trim cover 12. The trim plate 16 defines an opening 17. A bezel 18 is received in the opening 17 in the trim plate 16. The bezel 18 is positioned around a child restraint system's (CRS) top tether wire 20 (shown in FIGS. 3 and 8 to 10). A hook 80 of a child seat (not shown) is attached to the top tether wire 20 to secure the child seat to the vehicle seat 10 (shown in FIG. 8).

FIGS. 2 to 5 illustrate the bezel 18. The bezel 18 includes a trim 22 and a housing 24, and the trim 22 surrounds the housing 24. In one example, the bezel 18 can be made of resin. In one example, the bezel 18 can be made of polypropylene or polyethylene. In one example, the bezel 18 can be injection molded. In one example, the bezel 18 has a thickness T of approximately 2 mm and a weight of approximately 21 grams.

Figure 2:
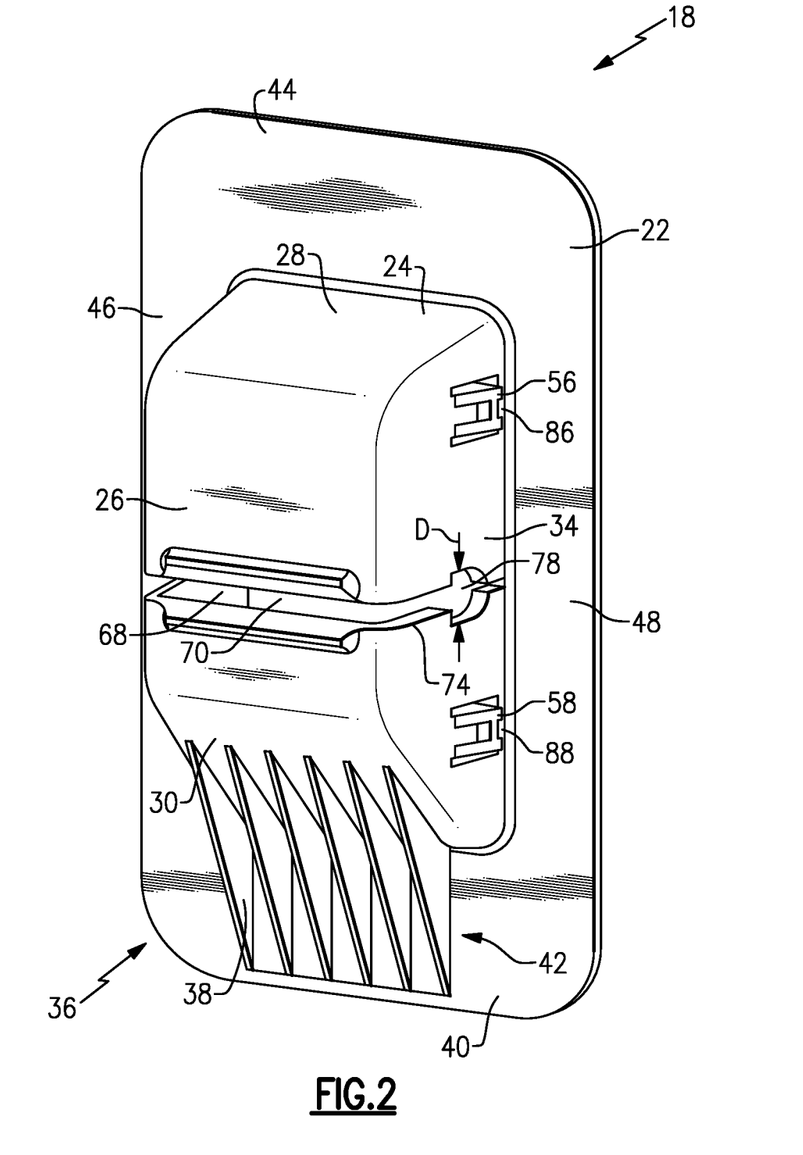
FIG. 2 illustrates a perspective front view of a bezel.
Figure 3:
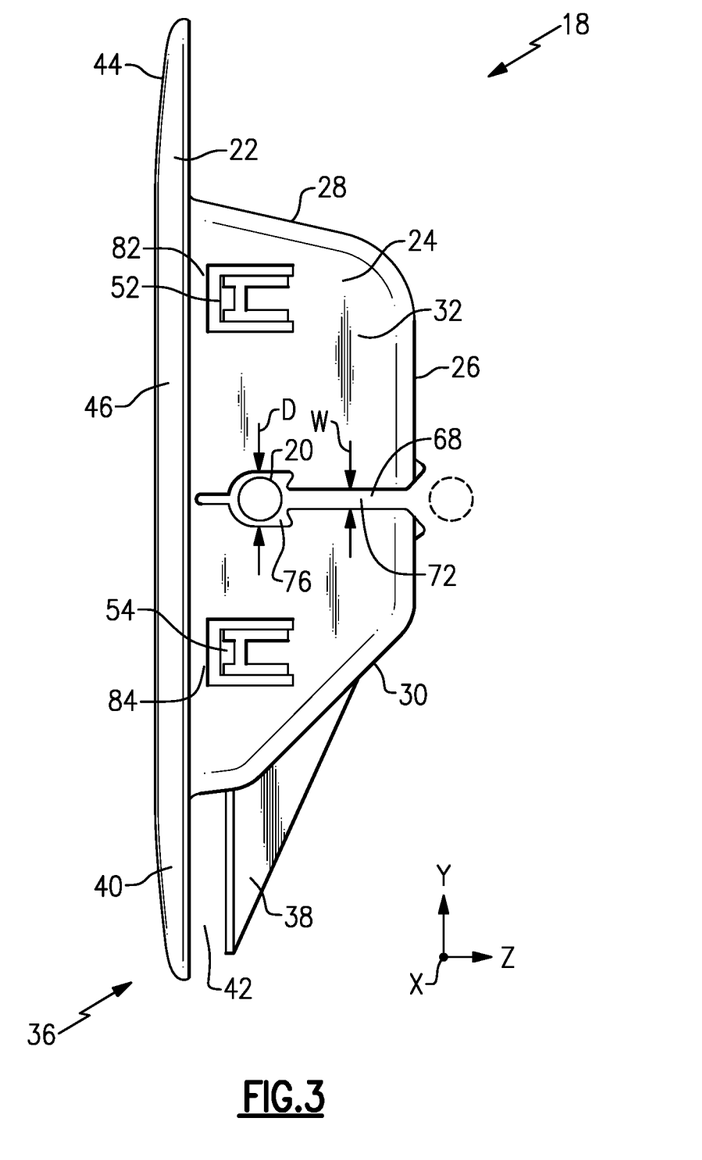
FIG. 3 illustrates a side view of the bezel.
Figure 4:
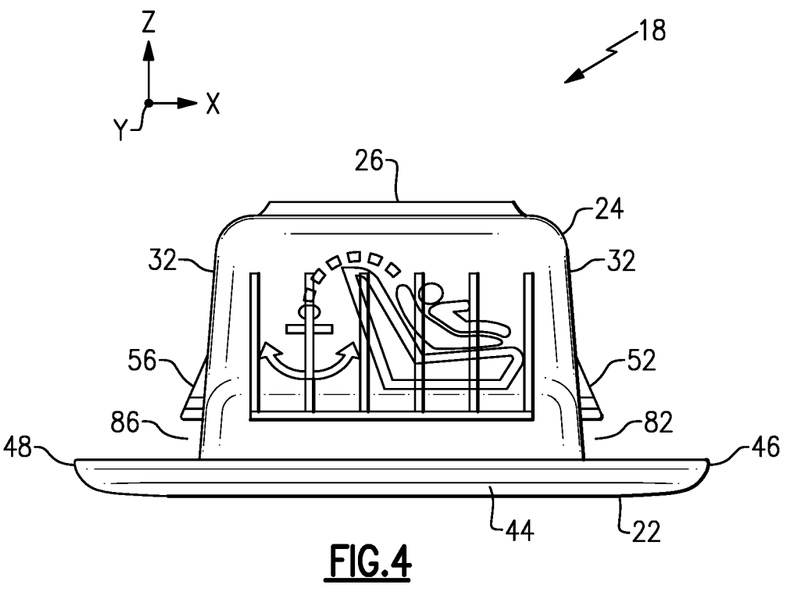
FIG. 4 illustrates a top view of the bezel.

As shown in FIGS. 2 and 3, the trim 22 includes a bottom portion 36 including a front flange 38 and a rear flange 40, and a space 42 is defined between the front flange 38 and the rear flange 40. The trim 22 also includes a top flange 44 opposite to the bottom portion 36, a first side flange 46, and a second side flange 48 opposite to the first side flange 46.

The housing 24 includes a front face 26, a top face 28, a bottom face 30 opposite to the top face 28, a first side face 32, and a second side face 34 opposite to the first side face 32.

Figure 6:
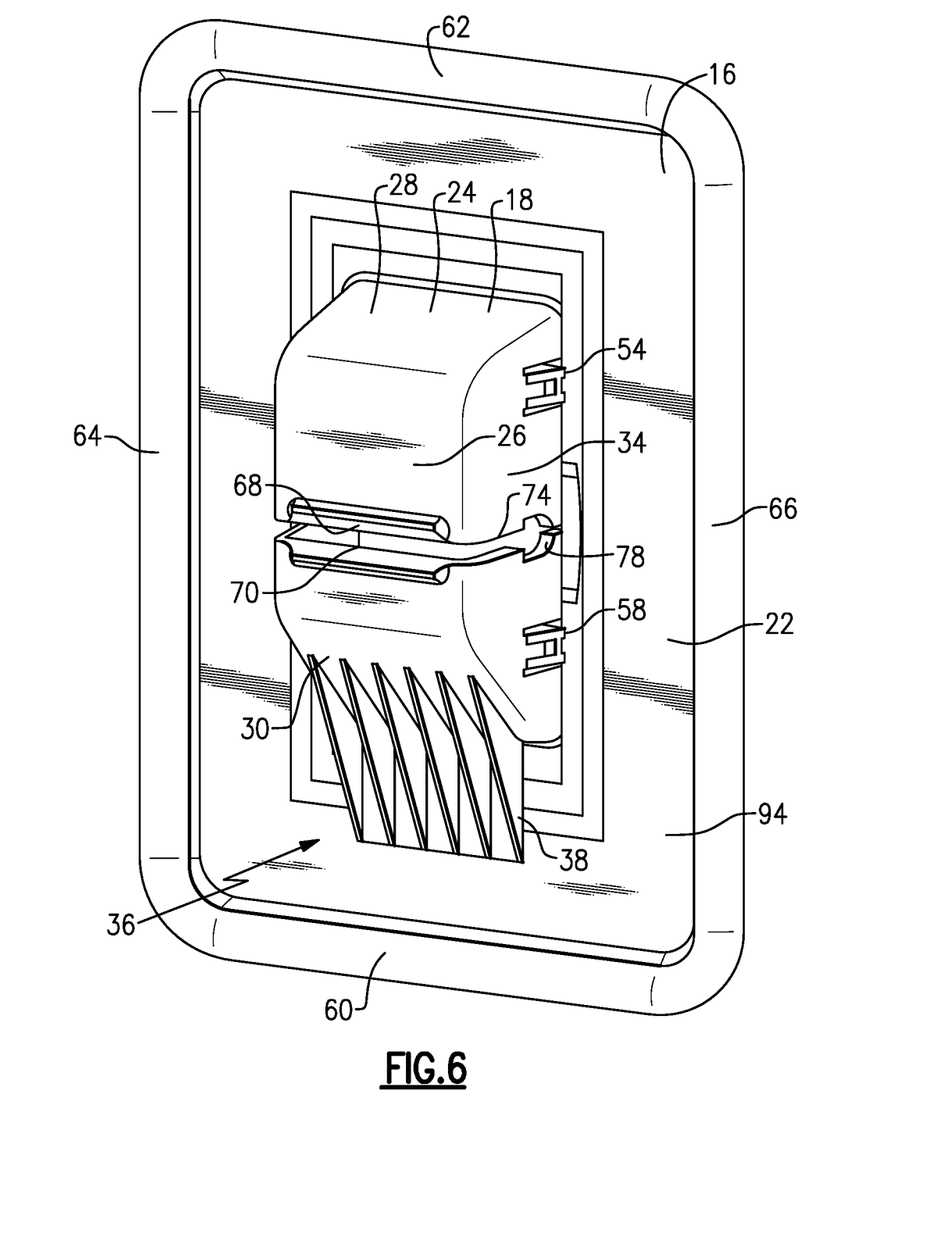
FIG. 6 illustrates a perspective front view of the bezel received in the trim plate.

FIGS. 6 to 10 illustrates the bezel 18 received in the trim plate 16. As shown in FIG. 6, the bezel 18 fits within the trim plate 16 and closes the opening 17 (shown in FIG. 1) of the trim plate 16.

Figure 7:
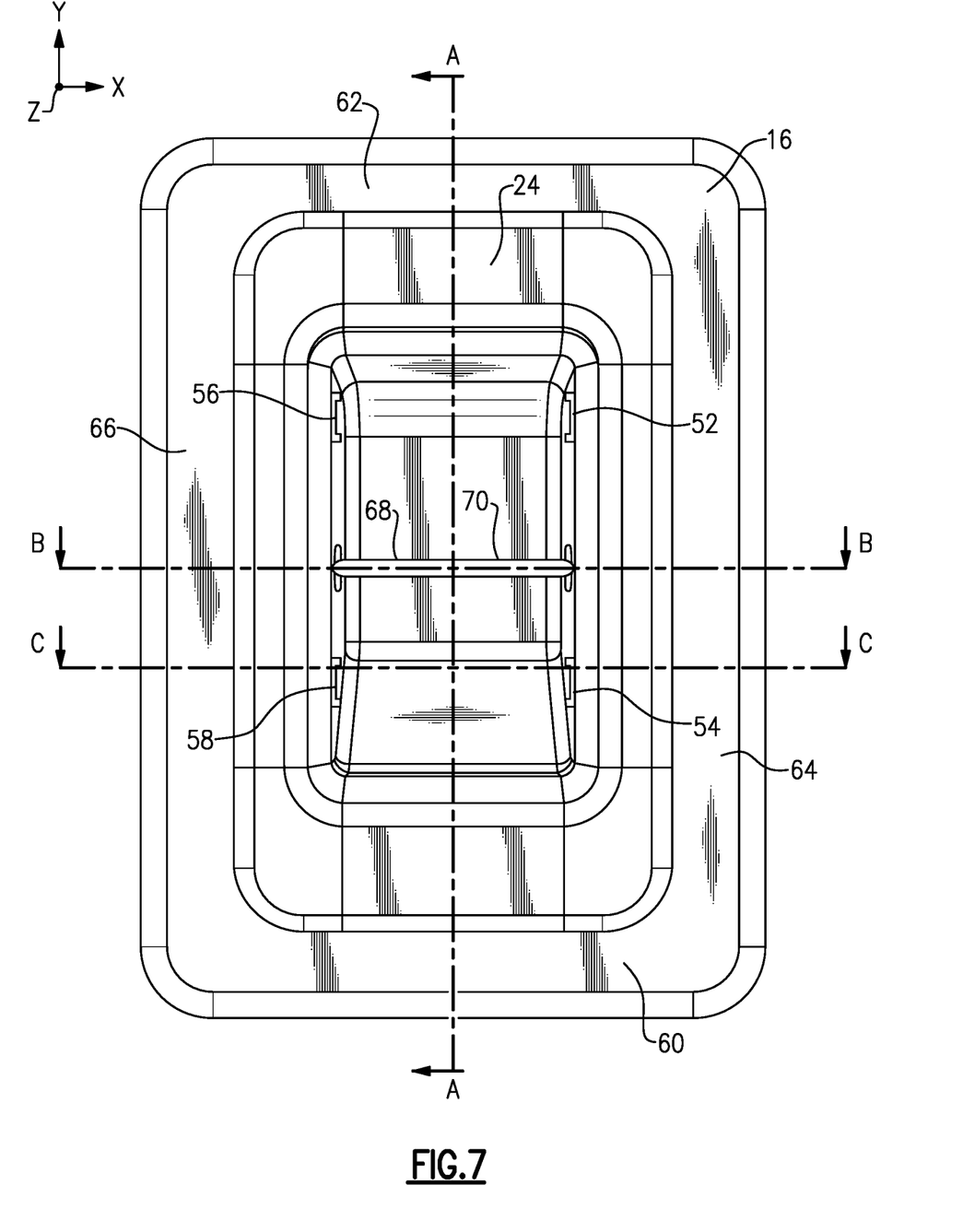
FIG. 7 illustrates a rear view of the bezel received in the trim plate.

The trim plate 16 includes the opening 17. The trim plate 16 includes a bottom portion 60, a top portion 62 opposite to the bottom portion 60, a first side portion 64, and a second side portion 66 opposite to the first side portion 64 and defines a rectangular trim plate 16.

When the bezel 18 is received in the trim plate 16, the bottom portion 36 of the trim 22 of the bezel 18 aligns with the bottom portion 60 of the trim plate 16, with the trim cover 12 positioned in the space 42 therebetween. The top flange 44 of the trim 22 of the bezel 18 aligns with the top portion 62 of the trim plate 16, with the trim cover 12 positioned therebetween. The first side flange 46 of the trim 22 of the bezel 18 aligns with the first side portion 64 of the trim plate 16, with the trim cover 12 positioned therebetween. The second side flange 48 of the trim 22 of the bezel 18 aligns with the second side portion 66 of the trim plate 16, with the trim cover 12 positioned therebetween.

The trim cover 12 and the trim plate 16 are attached with stiches 50. The stitches 50 are located outside the housing 24 of the bezel 18 when the bezel 18 is attached to the trim plate 16.

Figure 5:
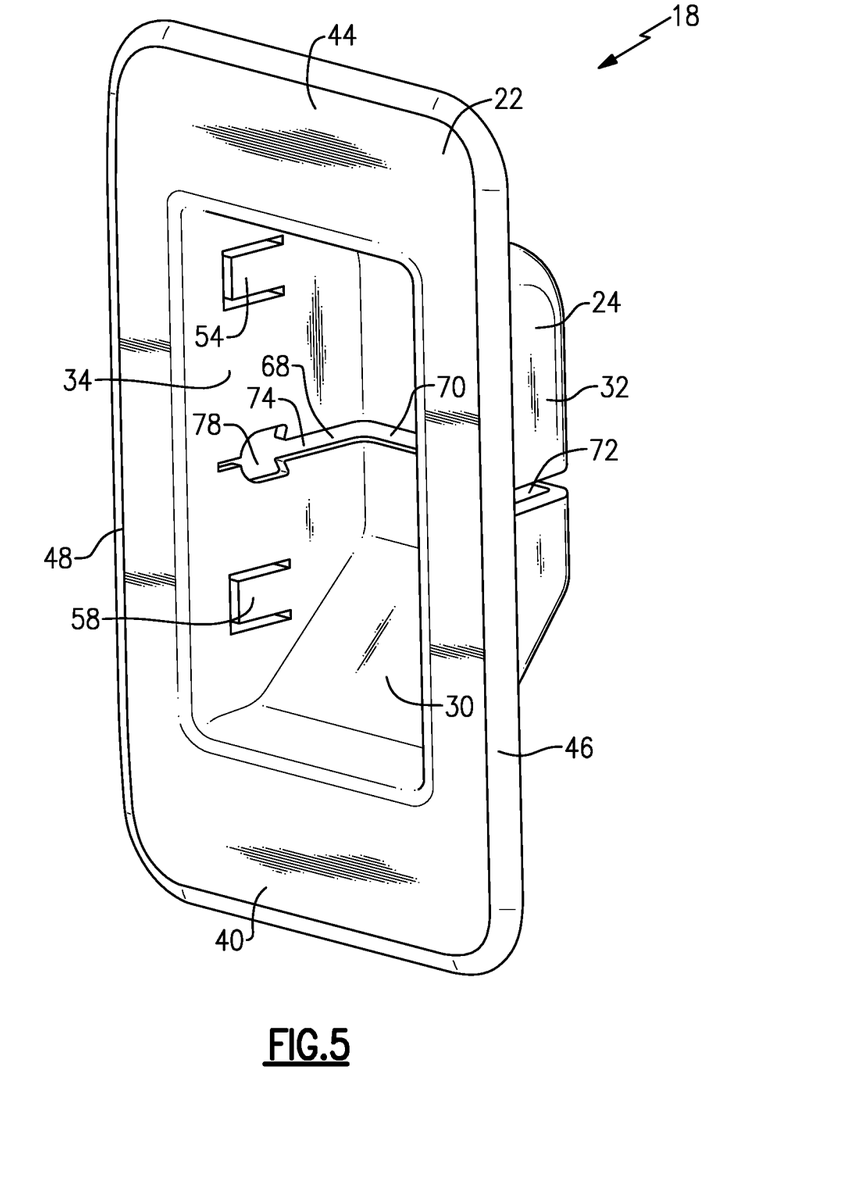
FIG. 5 illustrates a perspective rear view of the bezel.

The first side face 32 of the housing 24 includes a first resilient tab 52 and a second resilient tab 54, and the second side face 34 of the housing 24 includes a third resilient tab 56 and a fourth resilient tab 58. In one example, the first resilient tab 52 and the third resilient tab 56 are upper resilient tabs, and the second resilient tab 54 and the fourth resilient tab 58 are lower resilient tabs. The resilient tabs 52, 54, 56, and 58 are resilient so that they can compress to allow the housing 24 of the bezel 18 to pass through the opening 17 of the trim plate 16 and to be secured to the trim plate 16. A first space 82 and a second space 84 are defined between the first resilient tab 52 and the second resilient tab 54, respectively, and the first side flange 46 of the trim 22, and a third space 86 and a fourth space 88 are defined between the third resilient tab 56 and the fourth resilient tab 58, respectively, and the second side flange 48 of the trim 22.

Figure 8:
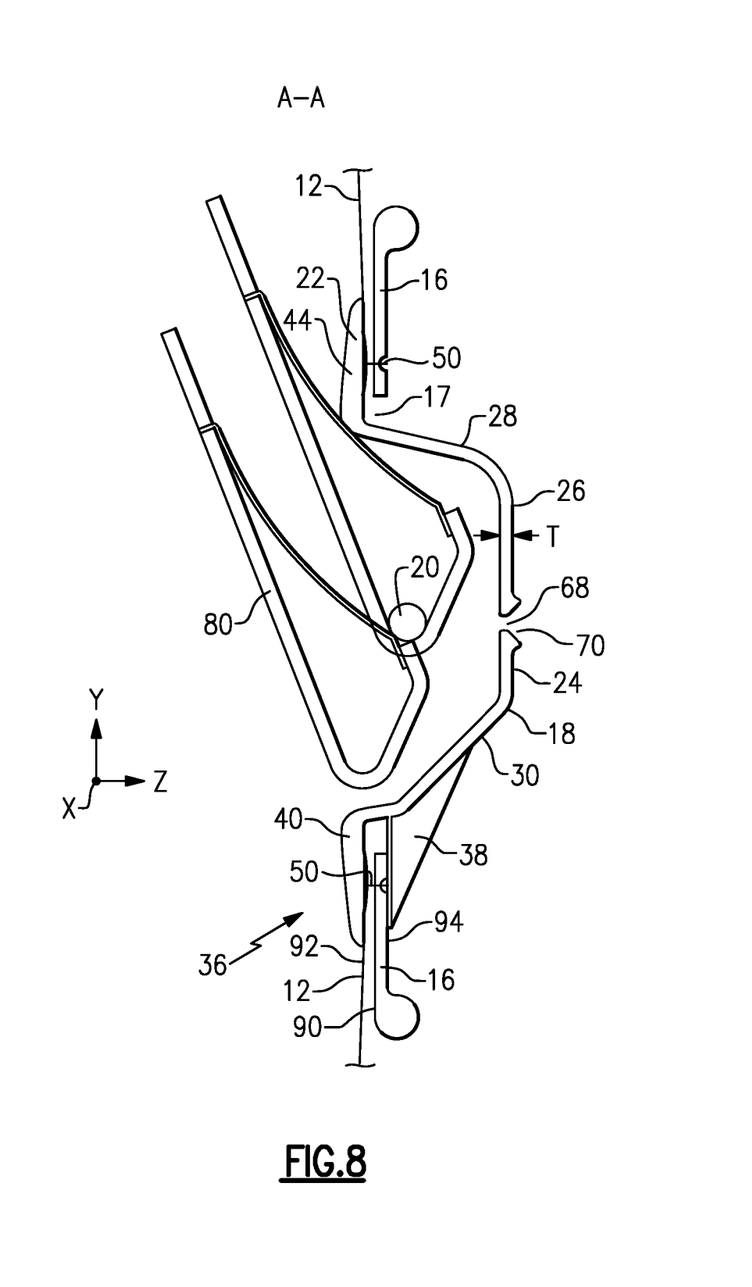
FIG. 8 illustrates a cross-sectional side view of the bezel relative to the trim plate taken along line A-A of FIG. 6.
Figure 9:
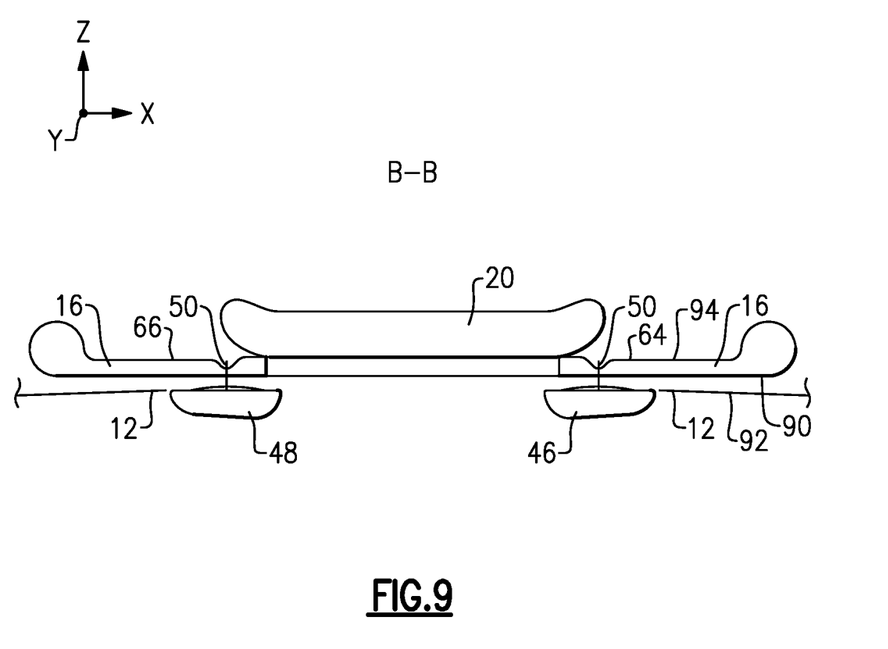
FIG. 9 illustrates a cross-sectional top view of the bezel installed relative to the trim cover and the trim plate taken along line B-B of FIG. 7.

The bezel 18 is attached to the trim plate 16 and the trim cover 12 from behind the trim cover 12. The front flange 38 of the bottom portion 36 of the trim 22 of the bezel 18 is positioned in front of the bottom portion 60 of the trim plate 16, and the rear flange 40 is positioned behind the trim cover 12. That is, a portion of the trim cover 12 and a portion of the bottom portion 60 of the trim plate 16, which are connected by the stitches 50, are received in the space 42 between the front flange 38 and the rear flange 40. In one example, the stitches 50 of the bottom portion 60 of the trim plate 16 and the trim cover 12 are located within the space 42.

The bezel 18 is then moved or pivoted towards a rear surface 90 of the trim plate 16 and pulled in the die draw direction Z until the bezel 18 is received in the opening 17 of the trim plate 16. As a portion of the trim cover 12 and a portion of the bottom portion 60 of the trim plate 16 are received in the space 42 between the front flange 38 and the rear flange 40 of the trim 22 of the bezel 18. The bezel 18 is allowed to rotate about an axis defined by a point that is between the front flange 38 and the rear flange 40 of the bottom portion 36 that is parallel to the X axis. Initially, the resilient tabs 52, 54, 56, and 58 are in an initial position. As the bezel 18 approaches the trim plate 16, the resilient tabs 52, 54, 56, and 58 engage the trim plate 16 and are biased inwardly to a biased position due to their resilient nature. This allows the resilient tabs 52, 54, 56, and 58 to move over the trim plate 16 and be located in front of the trim plate 16.

Once the bezel 18 is received in the opening 17 of the trim plate 16, the resilient tabs 52, 54, 56, and 58 return to their initial position, securing the bezel 18 to the trim plate 16. As a result, the bezel 18 "snaps" onto the trim plate 16 and the trim cover 12 to secure the bezel 18 to the trim plate 16. Once the bezel 18 is secured to the trim plate 16, the trim 22 of the bezel 18 and the trim cover 12 are received in the spaces 82, 84, 86, and 88 of the resilient tabs 52, 54, 56, and 58, respectively.

Figure 10:
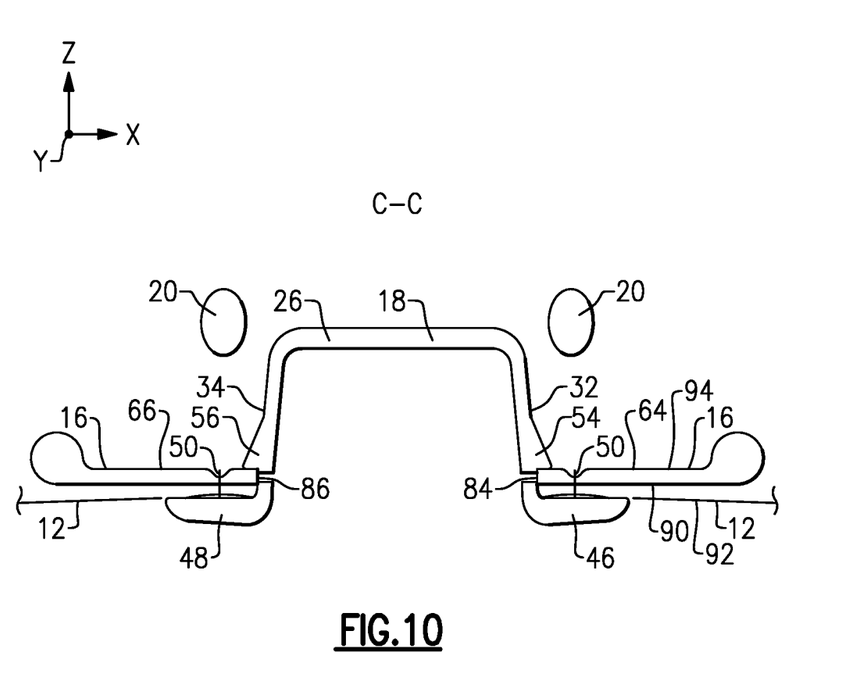
FIG. 10 illustrates a cross-sectional top view of the bezel installed relative to the trim cover and the trim plate taken along line C-C of FIG. 7.

FIG. 10 shows the bezel 18 attached to the trim plate 16 such that the first side portion 64 of the bezel 18 (and the trim cover 12) is received in the second space 84 between the second resilient tab 54 and the first side flange 46 of the trim 22, and the second side portion 66 of the bezel 18 (and the trim cover 12) is received in the fourth space 88 between the fourth resilient tab 58 and the second side flange 48 of the trim 22. Screws and other non-molded in features are not needed to secure the bezel 18 to the trim plate 16.

Once the bezel 18 is attached to the trim plate 16, the rear flange 40 of the bottom portion 36, the top flange 44, the first side flange 46, and the second side flange 48 of the trim 22 contact a rear surface 92 of the trim cover 12. The front flange 38 of the bottom portion 36 of the trim 22 contacts a front surface of the trim plate 16.

The housing 24 of the bezel 18 includes a channel 68 that receives the top tether wire 20. In one example, the channel 68 includes a main portion 70, a first portion 72, and a second portion 74. The main portion 70 of the channel 68 extends across the front face 26 of the housing 24, the first portion 72 of the channel 68 extends across the first side face 32 of the housing 24, and a second portion 74 of the channel 68 extends across the second side face 34 of the housing 24. The main portion 70, the first portion 72, and the second portion 74 of the channel 68 are continuous and have a width W. However, the resiliency of the bezel 18 can cause the width W to expand, as explained below.

A first enlarged opening 76 and a second enlarged opening 78 are each located at the end of the first portion 72 and the second portion 74 of the channel 68, respectively. The first enlarged opening 76 and a second enlarged opening 78 are continuous with the channel 60 and are proximate to the first side flange 46 and the second side flange 48, respectively, of the trim 22 of the bezel 18. The first enlarged opening 76 is located between the first resilient tab 52 and the second resilient tab 54, and the second enlarged opening 78 is located between the third resilient tab 56 and the fourth resilient tab 58. The first enlarged opening 76 and a second enlarged opening 78 both have a dimension D that is larger than the width W of the channel 68.

The top tether wire 20 is initially located outside the housing 24 of the bezel 18, as shown in dashed lines in FIG. 3. When the bezel 18 is attached to the vehicle seat 10 as described above, the bezel 18 is moved or pivoted towards the top tether wire 20 to snap around the top tether wire 20.

The bezel 18 is rotated to approach the top tether wire 20 and is then pressed onto the top tether wire 20. In an initial position, the bezel 18 is not attached to the top tether wire 20 (the top tether wire 20 is shown in dashed lines in FIG. 3). The bezel 18 is then pressed towards the top tether wire 20. The resiliency of the bezel 18 causes the channel 68 to expand in width W from an initial width to a biased width, allowing the top tether wire 20 to travel through the channel 68 until the top tether wire 20 is received in the first enlarged opening 76 and a second enlarged opening 78 (shown in solid lines in FIG. 3 in the secured position). When the top tether wire 20 is located in the first enlarged opening 76 and a second enlarged opening 78, the channel 68 returns to the initial width, retaining the top tether wire 20 in the first enlarged opening 76 and a second enlarged opening 78. The bezel 18 restricts the top tether wire 20 from exiting through the channel 68 unless the channel 68 of the bezel 18 is enlarged manually.

The bezel 18 does not need a frame or a board support for attachment to the trim plate 16. The bezel 18 attaches directly to the trim plate 16, the trim cover 12, and the top tether wire 20.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle seat assembly comprising:
a flexible trim cover including an opening;
a trim plate received in the opening of the trim cover, wherein the trim plate includes an opening;
a bezel received in the opening of the trim plate, wherein the bezel includes a trim and a housing, the trim surrounds the housing, and the housing of the bezel includes a channel that receives a top tether wire.

2. The vehicle seat assembly as recited in claim 1 wherein the bezel is comprised of resin.

3. The vehicle seat assembly as recited in claim 1 wherein the trim cover and the trim plate are attached with stiches.

4. The vehicle seat assembly as recited in claim 1 wherein a front surface of the trim of the bezel contacts a rear surface of the trim cover.

5. The vehicle seat assembly as recited in claim 1 wherein the trim of the bezel includes a bottom portion including a front flange and a rear flange defining a space therebetween, a top flange, a first side flange, and a second side flange, the trim plate includes a bottom portion, a top portion, a first side portion, and a second side portion, wherein a portion of the bottom portion of the trim plate is received in the space between the front flange and the rear flange of the bottom portion of the trim of the bezel, the top flange of the trim of the bezel aligns with the top portion of the trim plate, the first side flange of the trim of the bezel aligns with the first side portion of the trim plate, and the second side flange of the trim of the bezel aligns with the second side portion of the trim plate.

6. The vehicle seat assembly as recited in claim 1 wherein the housing of the bezel includes a first side face, a second side face, at least one resilient tab located on the first side face of the housing, and another at least one resilient tab located on the second side face of the housing, wherein the at least one resilient tab and the another at least one resilient tab secure the trim of the bezel to the trim plate.

7. The vehicle seat assembly as recited in claim 6 wherein, when in an initial position, a space is defined between the at least one resilient tab and the first side flange of the trim of the bezel and another space is defined between the another at least one resilient tab and the second side flange of the trim of the bezel, insertion of the housing of the bezel into the opening of the trim plate biases the at least one resilient tab and the another at least one resilient tab from the initial position to a biased position to allow insertion of the housing of the trim bezel into the opening of the trim plate, and the at least one resilient tab and the another at least one resilient tab return to the initial position once the first side portion and the second side portion, respectively, of the trim bezel are received in the space and the another space, respectively, of the bezel to secure the bezel to the trim plate.

8. The vehicle seat assembly as recited in claim 1 wherein the housing of the bezel includes a front face, a top face, a bottom face, a first side face, a second side face, and a channel that receives the top tether wire, wherein the channel includes a main portion on the front face of the housing, a first portion on the first side face of the housing, and a second portion on the second side face of the housing.

9. The vehicle seat assembly as recited in claim 1, wherein the housing of the bezel includes a first enlarged opening located at an end of the first portion of the channel that is continuous with the first portion of the channel and a second enlarged opening located at an end of the second portion of the channel that is continuous with the second portion of the channel, the first enlarged opening and the second enlarged opening both have a dimension greater than the width of the channel, and the channel has an expandable width to allow passage of the top tether wire through the channel and into the first enlarged opening and the second enlarged opening, and the first enlarged opening and the second enlarged opening are proximate to the first side portion and the second side portion, respectively, of the trim plate.

10. The vehicle seat assembly as recited in claim 1 wherein the at least one resilient tab comprises a first resilient tab and a second resilient tab, the another at least one resilient tab comprises a third resilient tab and a fourth resilient tab, and the first enlarged opening is located between the first resilient tab and the second resilient tab, and the second enlarged opening is located between the third resilient tab and the fourth resilient tab.

11. A vehicle seat assembly comprising:
a flexible trim cover including an opening;
a trim plate received in the opening of the trim cover, wherein the trim plate includes a bottom portion, a top portion, a first side portion, and a second side portion, and the trim plate defines an opening;
a bezel received in the opening of the trim plate, wherein the bezel includes a housing and a trim that surrounds the housing,
wherein the trim of the bezel includes a bottom portion including a front flange and a rear flange defining a space therebetween, a top flange, a first side flange, and a second side flange,
the housing of the bezel includes a front face, a top face, a bottom face, a first side face, a second side face, and a channel that receives the top tether wire, wherein the channel includes a main portion on the front face of the housing, a first portion on the first side face of the housing, and a second portion on the second side face of the housing, wherein the channel receives a top tether wire, at least one resilient tab is located on the first side face of the housing, another at least one resilient tab is located on the second side face of the housing, and the at least one resilient tab and the another at least one resilient tab secure the trim of the bezel to the trim plate,
wherein a front surface of the trim of the bezel contacts a rear surface of the trim cover,
wherein a portion of the bottom portion of the trim plate is received in the space between the front flange and the rear flange of the bottom portion of the trim of the bezel, the top flange of the trim of the bezel aligns with the top portion of the trim plate, the first side flange of the trim of the bezel aligns with the first side portion of the trim plate, and the second side flange of the trim of the bezel aligns with the second side portion of the trim plate,
wherein, when in an initial position, a space is defined between the at least one resilient tab and the first side flange of the trim of the bezel and another space is defined between the another at least one resilient tab and the second side flange of the trim of the bezel, insertion of the housing of the bezel into the opening of the trim plate biases the at least one resilient tab and the another at least one resilient tab from the initial position to a biased position to allow insertion of the housing of the trim bezel into the opening of the trim plate, and the at least one resilient tab and the another at least one resilient tab return to the initial position once the first side portion and the second side portion, respectively, of the trim bezel are received in space and the another space, respectively, of the bezel to secure the bezel to the trim plate.

12. The vehicle seat assembly as recited in claim 11 wherein the bezel is comprised of resin.

13. The vehicle seat assembly as recited in claim 11 wherein the trim cover and the trim plate are attached with stiches.

14. The vehicle seat assembly as recited in claim 11 wherein the housing of the bezel includes a first enlarged opening located at an end of the first portion of the channel that is continuous with the first portion of the channel and a second enlarged opening located at an end of the second portion of the channel that is continuous with the second portion of the channel, the first enlarged opening and the second enlarged opening both have a dimension greater than the width of the channel, and the channel has an expandable width to allow passage of the top tether wire through the channel and into the first enlarged opening and the second enlarged opening, and the first enlarged opening and the second enlarged opening are proximate to the first side portion and the second side portion, respectively, of the trim plate.

15. The vehicle seat assembly as recited in claim 11 wherein the at least one resilient tab comprises a first resilient tab and a second resilient tab, the another at least one resilient tab comprises a third resilient tab and a fourth resilient tab, and the first enlarged opening is located between the first resilient tab and the second resilient tab, and the second enlarged opening is located between the third resilient tab and the fourth resilient tab.

16. A method of attaching a bezel to a flexible trim cover and a trim plate attached to a vehicle seat, the method comprising:
   positioning a portion of a trim plate in a space defined between a front flange and a rear flange of a trim of a bezel;
   rotating the bezel about an axis defined by a point between the front flange and the rear flange; and
   positioning the bezel in an opening of the trim plate.

17. The method as recited in claim 16, including securing the bezel to the trim plate with flexible fasteners.

\* \* \* \* \*